US006324052B1

(12) United States Patent
Azima et al.

(10) Patent No.: US 6,324,052 B1
(45) Date of Patent: Nov. 27, 2001

(54) PERSONAL COMPUTING DEVICES COMPRISING A RESONANT PANEL LOUDSPEAKER

(75) Inventors: Henry Azima, Cambridge; Martin Colloms, London; Norman Crocker, Hertfordshire; Martin Roberts, Suffolk, all of (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/398,205

(22) Filed: Sep. 17, 1999

Related U.S. Application Data

(63) Continuation of application No. PCT/GB98/00834, filed on Mar. 19, 1998, and a continuation-in-part of application No. 08/707,012, filed on Sep. 3, 1996, and a continuation-in-part of application No. 09/029,059, filed as application No. PCT/GB98/02142 on Sep. 2, 1996.

(30) Foreign Application Priority Data

Mar. 22, 1997 (GB) .................................................. 9705981

(51) Int. Cl.[7] ..................................................... H05K 5/00
(52) U.S. Cl. .......................... 361/683; 361/681; 361/682; 381/88–90; 381/303–307
(58) Field of Search ..................................... 361/683, 686, 361/681, 679, 682; 381/88–90, 303–307, 333, 386, 388, 152; D14/113, 114

(56) References Cited

U.S. PATENT DOCUMENTS

| 5,805,708 | * | 9/1998 | Freadman | 381/159 |
| 5,821,471 | * | 10/1998 | McCuller | 181/156 |
| 5,930,376 | * | 7/1999 | Markow et al. | 381/333 |
| 6,137,890 | * | 10/2000 | Markow | 381/330 |
| 6,151,206 | * | 11/2000 | Kato et al. | 361/681 |
| 6,151,401 | * | 11/2000 | Annaratone | 381/388 |
| 6,175,489 | * | 1/2001 | Markow et al. | 361/683 |

FOREIGN PATENT DOCUMENTS

| 0 700 210 | 3/1996 | (EP) . |
| 2 310 559 | 8/1997 | (GB) . |
| WO 96/20576 | 7/1996 | (WO) . |
| WO 97/09854 | 3/1997 | (WO) . |

* cited by examiner

Primary Examiner—Leo P. Picard
Assistant Examiner—David Foster
(74) Attorney, Agent, or Firm—Foley & Lardner

(57) ABSTRACT

A personal computing device, such as a lap-top computer, has a body with a keyboard, a lid with a display screen hinged to the body, a resonant panel loudspeaker carried by the lid and an acoustic waveguide on the lid to direct acoustic output from the loudspeaker. The waveguide comprises a member mounted on the lid, the member being movable on the lid from a retracted/closed position to an advanced/open position.

20 Claims, 6 Drawing Sheets

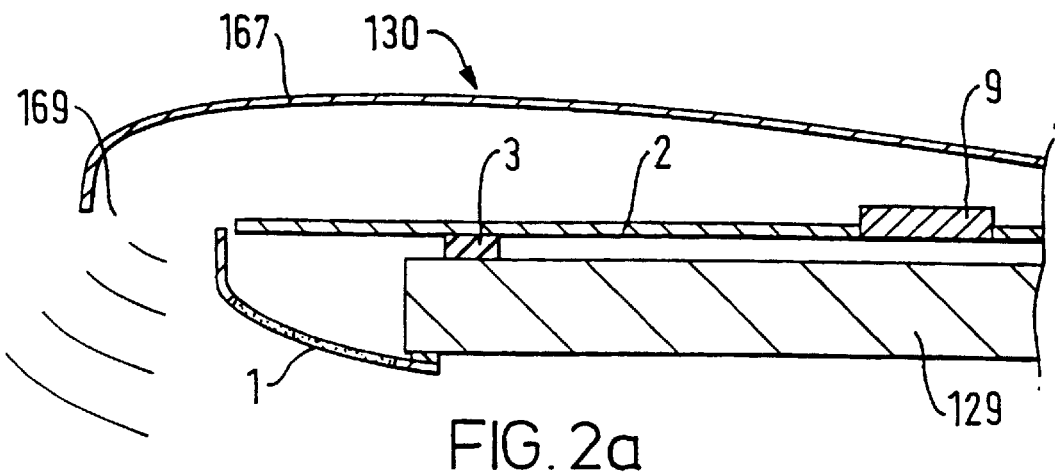
FIG. 2a
FIG. 2b
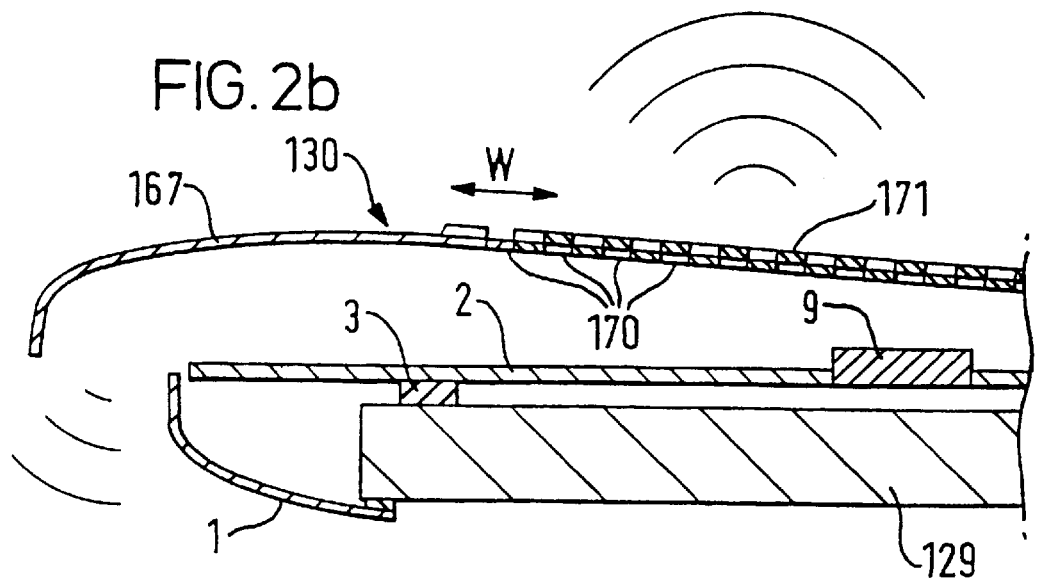

PERSONAL COMPUTING DEVICES COMPRISING A RESONANT PANEL LOUDSPEAKER

This application is a continuation of International application No. PCT/GB98/00834, filed Mar. 19, 1998; a continuation-in-part of U.S. application Ser. No. 08/707,012, filed Sep. 3, 1996; and a continuation-in-part of U.S. application Ser. No. 09/029,059, filed Sep. 2, 1996, as International application No. PCT/GB96/02142.

DESCRIPTION

1. Technical Field

The invention relates to personal computing devices and more particularly to lap-top and the like portable personal computers, e.g. so-called note-book computers and portable personal telephones incorporating loudspeakers.

2. Background Art

Embodiments of the present invention use members of nature, structure and configuration achievable generally and/or specifically by implementing teachings of our U.S. patent application Ser. No. 08/707,012. Such members thus have capability to sustain and propagate input vibrational energy by bending waves in operative area (s) extending transversely of thickness of ten but not necessarily to edges of the member(s); are configured with or without anisotropy of bending stiffness to have resonant mode vibration components distributed over said area(s) beneficially for acoustic coupling with ambient air; and have predetermined preferential locations or sites within said area for exciter means, particularly operationally active or moving part(s) thereof effective in relation to acoustic vibrational activity in said area(s) and signals, usually electrical, corresponding to acoustic content or such vibrational activity.

Members as above are herein called distributed mode acoustic radiators and are intended to be characterised as in the above U.S. parent application Ser. No. 08/707,012 and/or otherwise as specifically provided herein.

U.S. parent application Ser. No. 09/029,059 describes a laptop computer having an opposed pair of distributed mode loudspeakers attached to either side of the display screen.

EP 700 210 describes a television set with acoustic waveguides to channel the output of conventional left and right loudspeakers to the front of the television set.

WO 96/20574 describes a sound reproducing apparatus having an acoustic horn in the side of the apparatus.

This invention is particularly concerned with acoustic devices in the form of loudspeakers for personal computing devices, and with personal computing devices incorporating such loudspeakers.

DISCLOSURE OF INVENTION

According to the invention, there is provided a personal computing device having a body comprising a keyboard and a lid comprising a display screen hinged to the body to cover the keyboard, and a resonant panel loudspeaker in or attached to the lid, characterised by an acoustic waveguide or horn to direct acoustic output from the loudspeaker, wherein the waveguide or horn comprises a member mounted on the lid, the member being movable on the lid from a closed or retracted position to an advanced or open position.

The acoustic waveguide or horn may direct an acoustic output from the loudspeaker in a desired direction. The desired direction will normally be towards the user of the portable computing device.

An opposed pair of the waveguides or horns may be provided, e.g. to provide multi-channel acoustic output. The waveguide(s) or horn(s) may comprise a plate-like ember hinged to the lid.

The lid may be provided with one or more acoustically transparent apertures in its outer surface.

BRIEF DESCRIPTION OF DRAWINGS

The invention is diagrammatically illustrated, by way of example, in the accompanying drawings, in which:

FIGS. 2a and 2b are respective enlarged partial cross-sectional side views of alternative details in the embodiment of FIGS. 1 and 2;

BEST MODES FOR CARRYING OUT THE INVENTION

Figure 1:
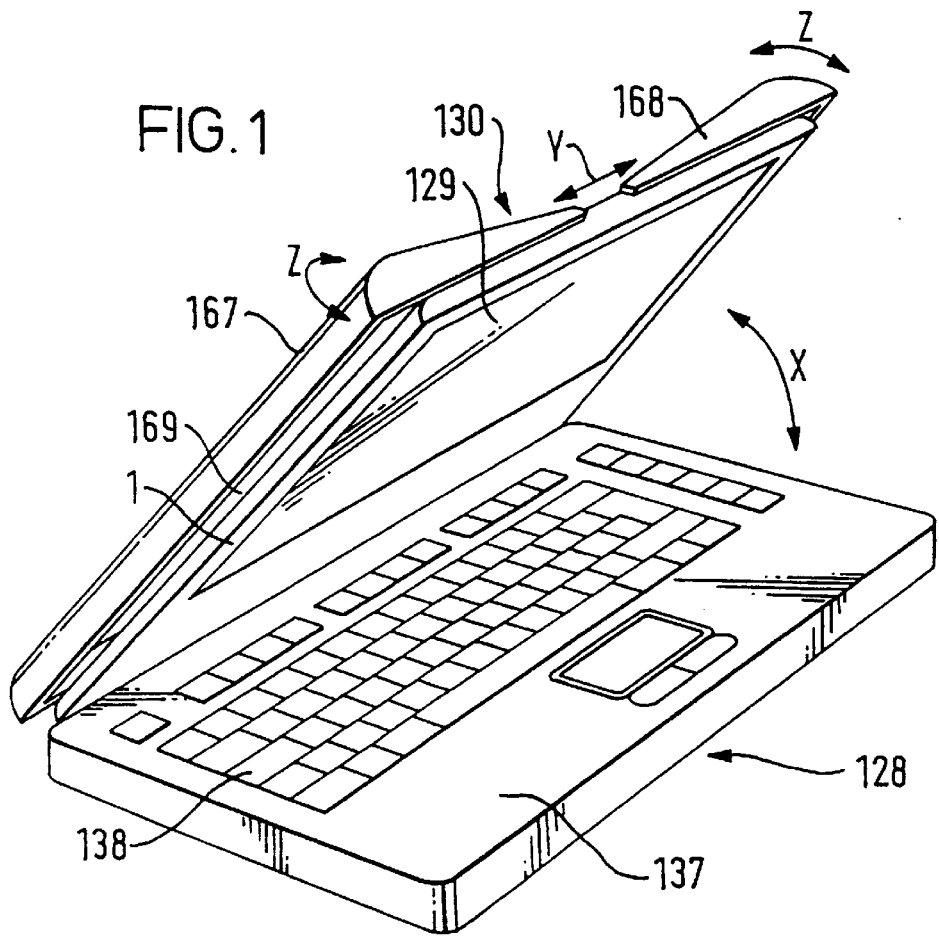
FIG. 1 is a front perspective view of a first embodiment of lap-top computer according to the present invention.
Figure 2:
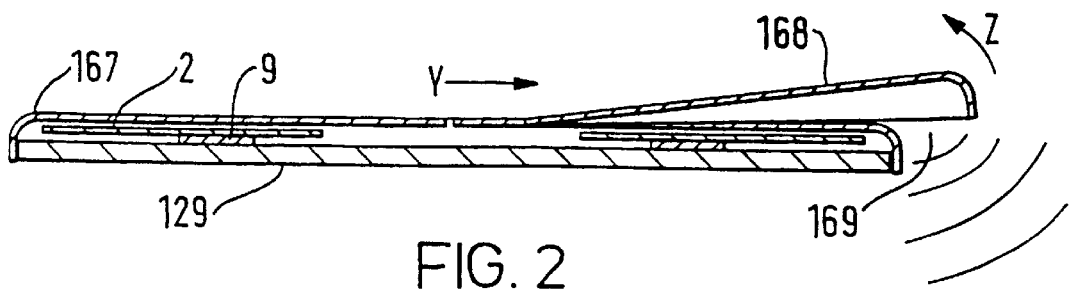
FIG. 2 is a cross-sectional view of the lid of the laptop computer.

FIGS. 1, 2 and 2a illustrate a lap-top personal computer (128) having a body (137) comprising a keyboard (138) and a lid (130) having a rectangular frame (1), e.g. of moulded plastics, supporting a visual display screen (129) and which lid is hinged to the body for movement as indicated by arrow X, between a folded position in which the lid encloses the keyboard and an erect position in which the lid is substantially upright.

The lid (130) houses an opposed pair of loudspeakers to adapt the computer for multi-media applications and the like, the loudspeakers each comprising a thin rectangular panel (2) forming a mu.:i-mode acoustic radiator of the kind described in parent application No. 08/707,012. Each loudspeaker panel (2) has a monolithic structure and is supported near to its periphery on discrete resilient suspension elements (3) e.g. of an elastomeric material, which in turn are supported on the surrounding frame (1) via the display screen (129). A vibration exciter (9) is mounted on each panel at a predetermined position as discussed more fully in parent application No. 08/707,012, to launch bending waves into each of the panels (2) to cause them to resonate to produce acoustic outputs. The exciters may be electrodynamic.

The lid (130) comprises an opposed pair of cover members (167,168) which together define the outer casing of the lid and are each shaped as a flat rectangular panel having a downturned peripheral rim extending round three adjacent sides, the fourth side being arranged to abut against the corresponding side of the opposite cover member. The cover members slide and hinge on the frame (1) in the directions indicated by arrows Y and Z respectively such that when extended from the closed position indicated at the left-hand side in FIG. 2 to their operative position indicated in FIG. 1 and the right-hand side in FIG. 2, they are locked by friction or other means to form acoustic waveguides or horn structures whose apertures (169) are presented to the opposite sides of the lid. The horn expansion effectively begins over the region of the loudspeakers. The diffuse sound energy and nearly constant power with frequency of the loudspeakers means that relatively good matching is achieved between the horn and the speaker elements. Benefits include relatively high acoustic efficiency, improved low range response and a sound directivity which is beneficially directed towards the user with reduced leakage towards others. The relatively small effective acoustic sources represented by the horn apertures (169) also will improve the sense of stereo image localisation for the user.

It might also be possible to incorporate the multi-mode speaker units in the lid cover members (167,168) where the radiation may then either be bidirectional and/or forwardly directed via the horn structure.

As shown in FIG. 2b it is possible to render the cover members (167,168) acoustically transparent by providing apertures (170) therein, the apertures being coverable by a sliding grille (171) to allow sound from the speaker to exit, or alternatively acoustically opaque when the grille is moved to cover the apertures, to direct the sound through and only through the horn element. The sliding grille would allow the user to open, or partially open and close the apertures to control the degree or mix of the horn effective component and the direct sound emitted via the grille.

Figure 3:
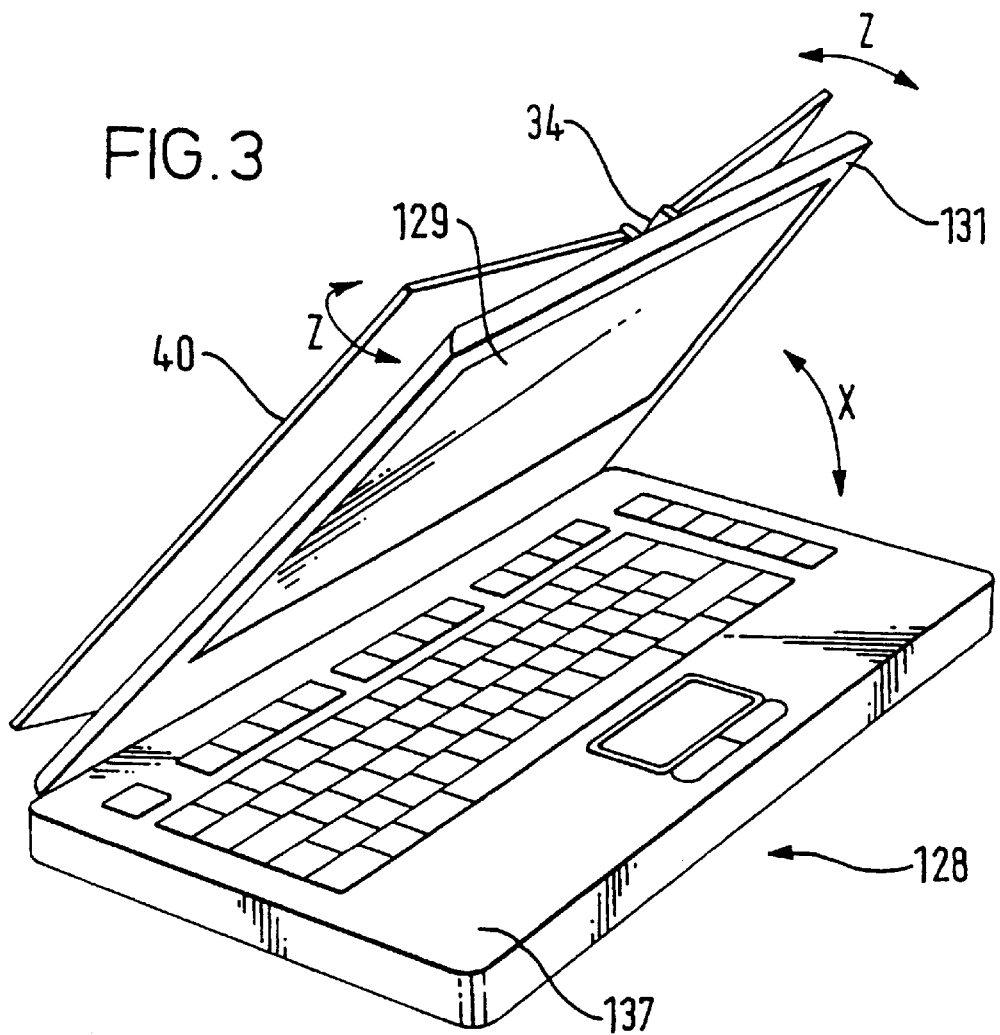
FIG. 3 is a front perspective view of a second embodiment or laptop computer.
Figure 3A:
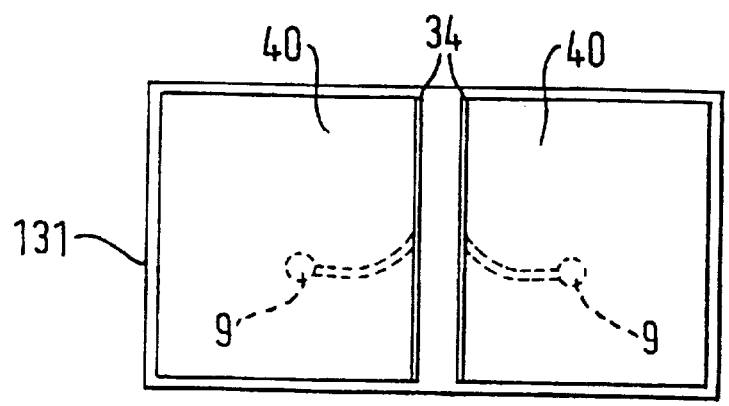
FIG. 3a is a plan view of the lid of the laptop computer of FIG. 3.

FIGS. 3 and 3a show a second embodiment of laptop computer which is generally similar to that described above with reference to FIGS. 1 and 2. However the complexity of the waveguide or horn mechanism is simplified, as compared to the embodiment of FIG. 1 and 2 so that opposed horn/waveguide elements are provided by the wedge shapes formed between flat plate elements (40) hinged by hinges (34) to the outer surface of a generally conventional lid (131) and the lid itself. In this embodiment, the elements (40) are or comprise multi-mode acoustic radiators of the kind described in U.S. parent application Ser. No. 08/707,012 and excited by vibration exciters (9) mounted thereon. The hinges (34) may have friction or detent action to allow both predetermined and/or user-preferred angles for the waveguide elements. Additionally the lid casing itself may be adapted to resonate according to distributed mode principles by control of effective area geometry and exciter position.

Figure 4:
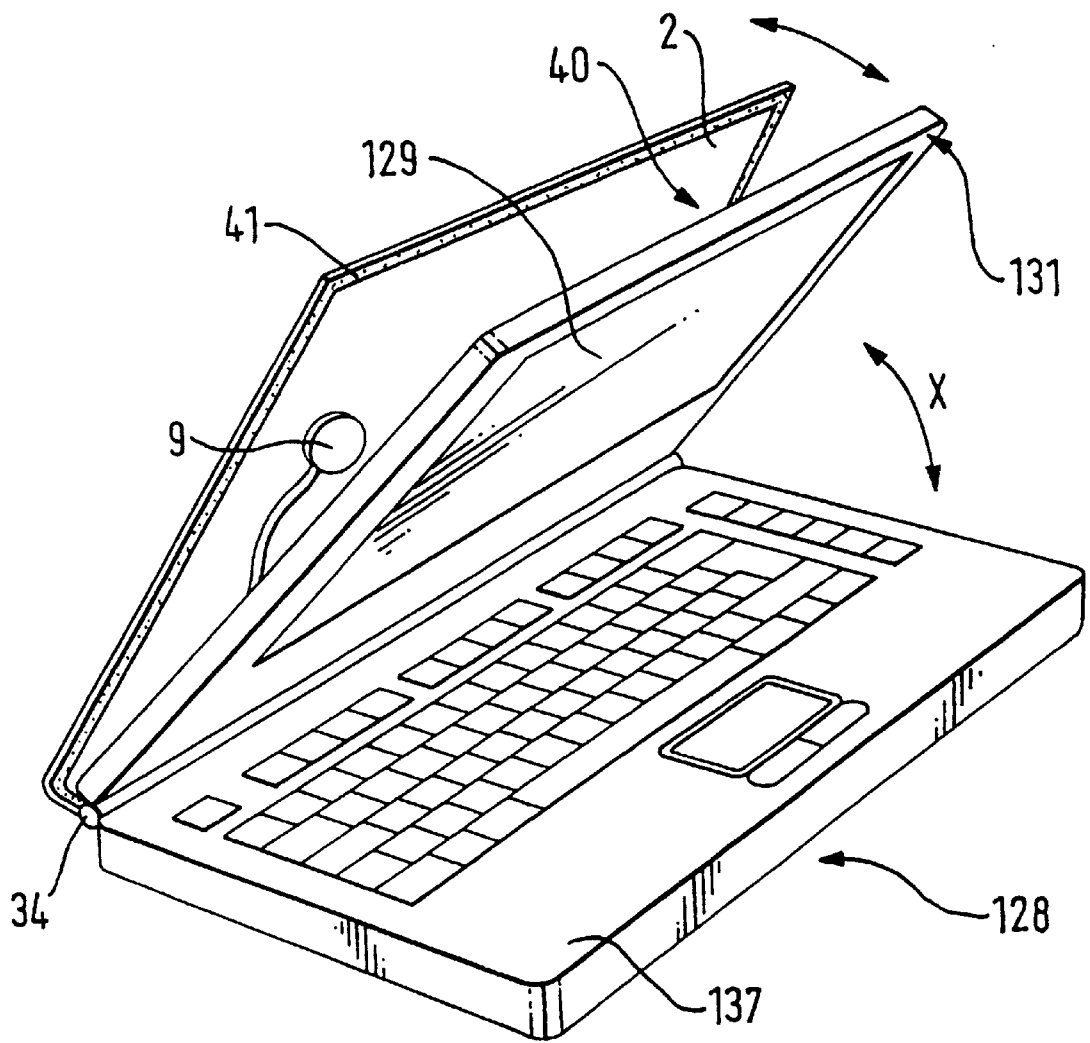
FIG. 4 is a front perspective view or a third embodiment of laptop computer.

The embodiment of FIG. 4 is generally similar to that of FIG. 3, but in this case, the generally conventional lid case (131) of the laptop computer is provided with a single plate-like cover (40) hinged to the body (137), to form a wedge-shaped cavity to provide horn-like loading for a multi-mode speaker (2) located within the cover.

The plate-like cover (40) is formed with a rectangular frame (41) supporting a distributed mode acoustic radiator panel (2) which may be bi-directional or forwardly directed according to the required acoustic efficiency and desired use. This plate-like cover may be single or multi-channel according to the properties of the plate and the location and number of exciters. Distributed mode speaker panels lend themselves to activation by multiple exciters due to the non-pistonic bending wave operation.

Figure 5:
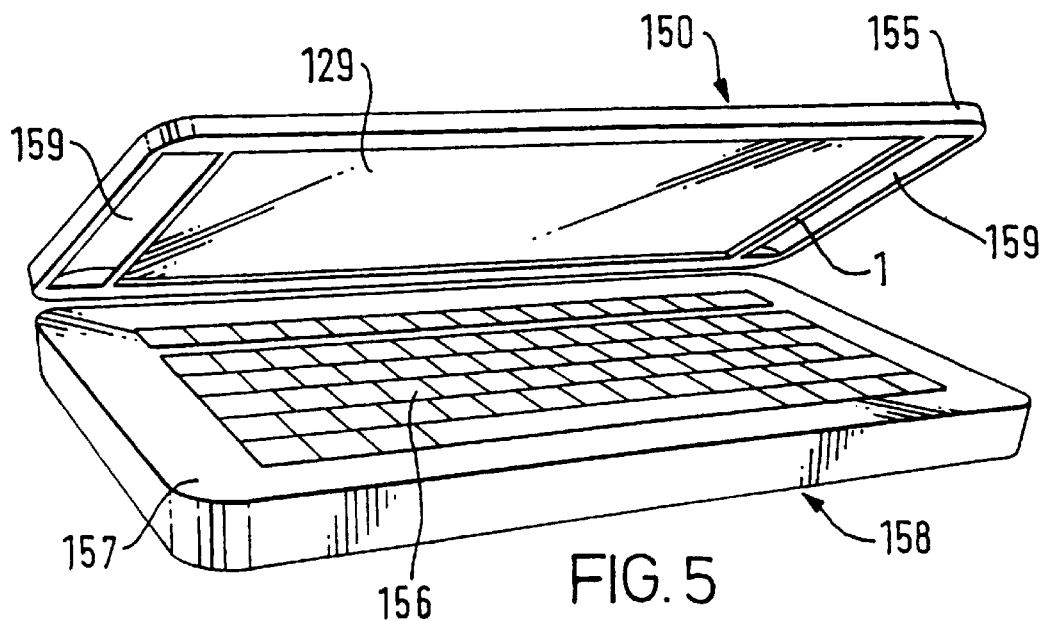
FIG. 5 is a front perspective view of a comparative example of an electronic personal organiser.
Figure 5A:
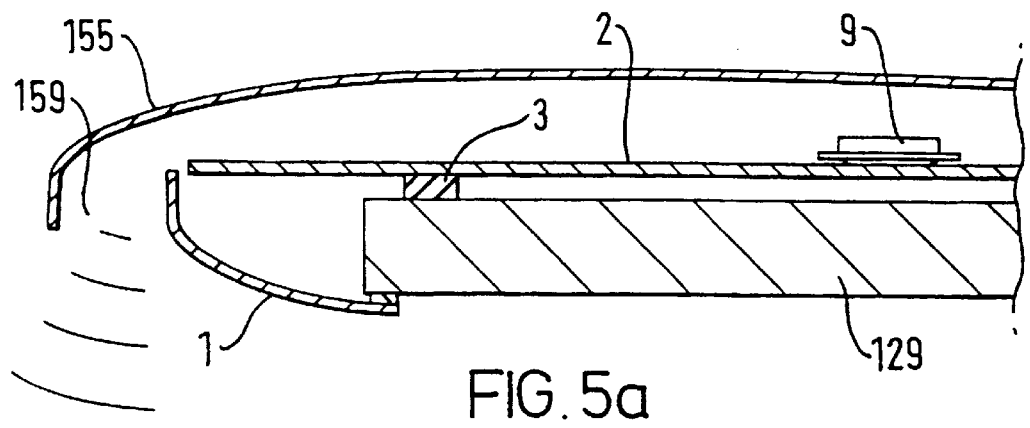
FIG. 5a is an enlarged partial cross-sectional side view of alternative details of the comparative example of FIG. 5.
Figure 5B:
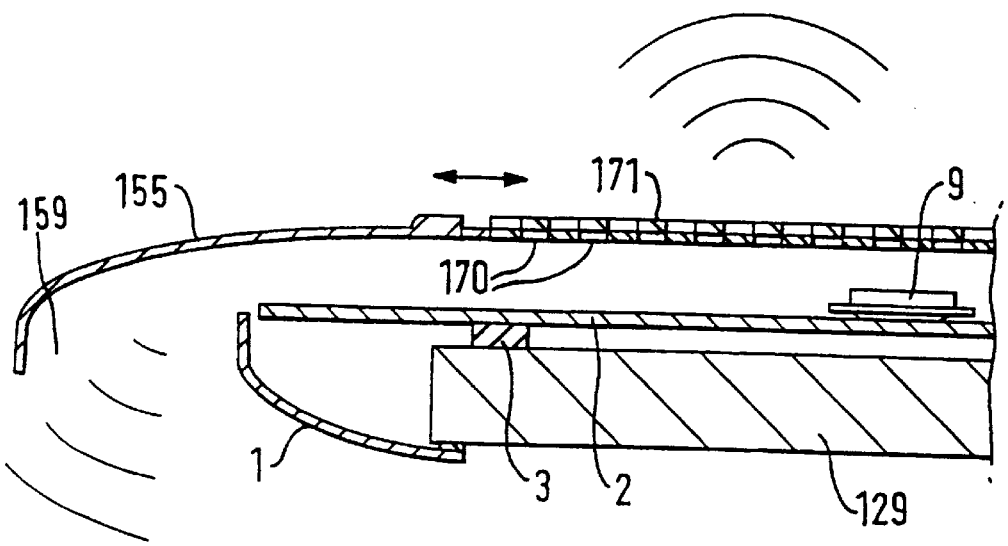
FIG. 5b is an enlarged partial cross-sectional side view of an embodiment of the invention.
Figure 6:
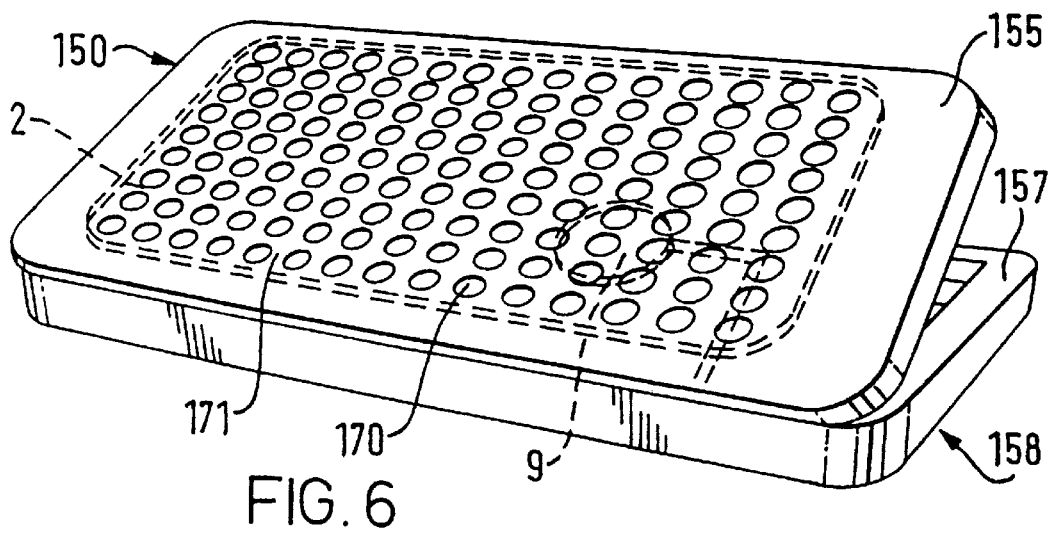
FIG. 6 is a rear perspective view of the comparative example of FIGS. 5 and 5A and the embodiment shown in FIG. 5b.

In the embodiment of FIGS. 5 and 6, the concept of the acoustic wave guide as described above is applied to distributed mode speaker(s) in the lid (150) of a personal digital assistant or personal data unit (158). The device (158) is generally similar to the laptop computer described above and comprises a body (157) having a keyboard (156) and a lid (150) hinged to the body and incorporating a visual display screen (129). The lid construction is similar to that described above with reference to FIGS. 2 and 2a or 2b, as indicated in FIGS. 5a and 5b, with the exception that in the present case the lid cover (155) is a fixed structure having a plate-like surface surrounded by a downturned peripheral lip and which carries a frame (1) supporting the display screen (129) with a resonant panel loudspeaker (2,9) resiliently mounted thereon. A pair of slots (159) are defined between opposite sides of the visual display screen (129) and the cover (155) which are coupled to an acoustic channel leading to the loudspeaker region and which directs sound towards the user. Optionally as shown in the embodiment of FIGS. 5b and 6, the lid casing may be perforated at (170) to allow sound to be radiated from the rear section, under the control of a movable grille (171). The diffuse radiation characteristic and bi-directional nature of the distributed mode speaker lends itself to the effectiveness of this application in the suggested mode of operation.

Where a personal data unit has audio modes of operation or may be combined with or associated with a mobile telephone, the relatively large distributed mode-type speaker installed in the lid provides a means for hands free communication and also will be effective for loudspeaking teleconferencing.

The lid cover (155) may also be designed as an integrated distributed mode speaker or speakers if desired.

What is claimed is:

1. A personal computing device (128) comprising: a body (137) having a keyboard (138), a lid (130, 150) having a display screen (129) hinged to the body (137) to cover the keyboard (138), a resonant panel loudspeaker (2, 40) carried by the lid (130, 150), and an acoustic waveguide to direct acoustic output from the loudspeaker (2), wherein the waveguide comprises a member (167, 168, 40) mounted on the lid, the member (167, 168, 40) being movable on the lid (130, 150) from a retracted/closed position to an advanced/open position.

2. A personal computing device according to claim 1, wherein the member (167, 168, 40) forms a lid cover.

3. A personal computing device according to claim 2, wherein the cover (40) comprises a resonant panel loudspeaker.

4. A personal computing device according to claim 1, wherein the loudspeaker panel (2) is supported in the lid (130, 150) by means of a resilient suspension (3).

5. A personal computing device according to claim 4, further comprising a frame (1) surrounding the panel (2) and on which the panel is suspended.

6. A personal computing device according to claim 5, wherein the display screen (129) is supported on the frame (1) and the loudspeaker panel (2) is resiliently supported on the display screen (129).

7. A personal computing device according to claim 2, comprising an opposed pair of waveguides.

8. A personal computing device according to claim 2 wherein the waveguide comprises a plate-like member (40) hinged to the lid (130, 150).

9. A personal computing device according to claim 8, wherein the lid (130, 150) is provided with one or more acoustically transparent apertures (170).

10. A personal computing device according to claim 9, further comprising a movable grille (171) to adjust acoustic output through the apertures.

11. A personal computing device according to claim 1, wherein the resonant panel loudspeaker (2) is integral with the lid (130, 150).

12. A personal computing device according to claim 11, wherein the resonant panel loudspeaker comprises a stiff lightweight panel (2) having a monolithic structure.

13. A personal computing device according to claim 12, wherein the resonant panel loudspeaker (2) is a distributed mode acoustic radiator.

14. A personal computing device according to claim 1, comprising an opposed pair of waveguides.

15. A personal computing device according to claim 1 wherein the waveguide comprises a plate-like member (40) hinged to the lid (130, 150).

16. A personal computing device according to claim 1, wherein the lid (130, 150) is provided with one or more acoustically transparent apertures.

17. A personal computing device according to claim 16, further comprising a movable grille (171) to adjust acoustic output through the apertures.

18. A personal computing device according to claim 9, wherein the resonant panel loudspeaker (2) is a distributed mode acoustic radiator.

19. A personal computing device according to claim 7, wherein the resonant panel loudspeaker (2) is a distributed mode acoustic radiator.

20. A personal computing device according to claim 1, wherein the resonant panel loudspeaker (2) is a distributed mode acoustic radiator.

* * * * *